(12) United States Patent
Becker et al.

(10) Patent No.: US 10,810,611 B2
(45) Date of Patent: Oct. 20, 2020

(54) SYSTEM AND METHOD FOR DEVELOPING INDIVIDUAL AND TEAM WASHROOM COMPLIANCE PRACTICES

(71) Applicant: Kimberly-Clark Worldwide, Inc., Neenah, WI (US)

(72) Inventors: Stephen Becker, Cumming, GA (US); Charlene Dunbar, Lilburn, GA (US); Jason Kirkland, Cumming, GA (US); Warren Moede, Atlanta, GA (US); Thomas H Schulz, Roswell, GA (US); Chrissy Sheehan, Media, PA (US); Peter W. Shipp, Jr., Woodstock, GA (US); Paul F. Tramontina, Harleysville, PA (US); Matthew T Zielinski, Darien, CT (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 202 days.

(21) Appl. No.: 15/552,602

(22) PCT Filed: Feb. 25, 2015

(86) PCT No.: PCT/US2015/017490
§ 371 (c)(1),
(2) Date: Aug. 22, 2017

(87) PCT Pub. No.: WO2016/137457
PCT Pub. Date: Sep. 1, 2016

(65) Prior Publication Data
US 2018/0033037 A1 Feb. 1, 2018

(51) Int. Cl.
*G06Q 30/02* (2012.01)
*G06Q 10/06* (2012.01)

(52) U.S. Cl.
CPC ..... *G06Q 30/0226* (2013.01); *G06Q 10/0639* (2013.01); *G06Q 10/06398* (2013.01); *G06Q 30/02* (2013.01); *G06Q 30/0207* (2013.01)

(58) Field of Classification Search
CPC .................................................. G06Q 30/0226
(Continued)

(56) References Cited

U.S. PATENT DOCUMENTS

| | | | |
|---|---|---|---|
| 4,896,144 A | 1/1990 | Bogstad | |
| 7,293,645 B2 * | 11/2007 | Harper | G08B 21/245 206/205 |

(Continued)

OTHER PUBLICATIONS

SCA Signs on as Port Sponsor of the 2014-2015 Volvo Ocean Race North American Stopover: SCA partners with the Volvo Ocean Race and Sail Newport to bring awareness to sustainability and hygiene solutions, PR Newswire, Jan. 13, 2015 (Year: 2015).*

(Continued)

*Primary Examiner* — Matthew L Hamilton
(74) *Attorney, Agent, or Firm* — Dority & Manning, P.A.

(57) ABSTRACT

A system and associated method for encouraging individual employees of a business, or members of a team, to practice proper washroom activities is provided. The employees or team members are enrolled a washroom rewards program, and certain washroom facilities are designated as available to the individuals for use in the rewards program. The washroom facilities are configured with an identification (ID) system that automatically identifies enrolled employees or team members that enter the facility. Point values are assigned in the washroom rewards program for defined washroom activities performed by the individuals in the designated washroom facilities, and upon performance of such activities, the individual is identified via the ID system and a personal account assigned to the individual is auto- (Continued)

matically credited with the point value. The points are redeemable by the individuals for an award value.

13 Claims, 5 Drawing Sheets

(58) Field of Classification Search
USPC .......................................................... 705/14
See application file for complete search history.

(56) References Cited

U.S. PATENT DOCUMENTS

| | | | |
|---|---|---|---|
| 7,616,122 B2 | 11/2009 | Bolling | |
| 7,782,214 B1* | 8/2010 | Lynn | G08B 21/245 340/573.1 |
| 7,783,380 B2 | 8/2010 | York et al. | |
| 8,344,893 B1* | 1/2013 | Drammeh | G08B 21/245 340/540 |
| 9,524,632 B2* | 12/2016 | Moore | G08B 21/245 |
| 9,558,647 B1* | 1/2017 | Drammeh | G08B 5/36 |
| 9,613,518 B2* | 4/2017 | Dunn | G06K 9/00335 |
| 10,529,219 B2* | 1/2020 | Herdt | G08B 21/245 |
| 2004/0201488 A1* | 10/2004 | Elul | G06Q 30/0242 340/686.6 |
| 2006/0067545 A1 | 3/2006 | Lewis et al. | |
| 2006/0067546 A1* | 3/2006 | Lewis | G08B 21/245 381/124 |
| 2006/0272361 A1* | 12/2006 | Snodgrass | G08B 21/245 68/19 |
| 2008/0087719 A1* | 4/2008 | Sahud | G08B 21/245 235/376 |
| 2008/0131332 A1* | 6/2008 | Nguyen | A61L 2/24 422/119 |
| 2009/0224924 A1* | 9/2009 | Thorp | G16H 40/20 340/573.1 |
| 2009/0267776 A1* | 10/2009 | Glenn | G16H 40/20 340/573.1 |
| 2010/0117836 A1* | 5/2010 | Seyed Momen | G01S 1/70 340/573.1 |
| 2010/0123560 A1 | 5/2010 | Nix et al. | |
| 2010/0164728 A1* | 7/2010 | Plost | G08B 21/245 340/573.1 |
| 2011/0316701 A1 | 12/2011 | Alper et al. | |
| 2012/0062382 A1* | 3/2012 | Taneff | G08B 21/245 340/573.1 |
| 2012/0245951 A1* | 9/2012 | Gips | G06Q 30/02 705/2 |
| 2013/0262034 A1* | 10/2013 | Iseri | G08B 21/245 702/187 |
| 2013/0332184 A1 | 12/2013 | Burnham et al. | |
| 2014/0009292 A1 | 1/2014 | Long et al. | |
| 2014/0104062 A1* | 4/2014 | Weiner | G08B 21/245 340/573.1 |
| 2014/0237028 A1 | 8/2014 | Messenger et al. | |
| 2014/0266692 A1* | 9/2014 | Freedman | G08B 21/245 340/539.11 |
| 2014/0364148 A1 | 12/2014 | Block et al. | |
| 2015/0228181 A1* | 8/2015 | Himmelmann | G06Q 10/063118 340/573.1 |
| 2016/0267772 A1* | 9/2016 | Iseri | G08B 21/245 |
| 2018/0293873 A1* | 10/2018 | Liu | G08B 21/245 |

OTHER PUBLICATIONS www.hagleitner.com/fileadmin/user_upload/brochure/senseMANAGEMENT_ENG_EZS_0I.pdf.
EPO Search Report, dated Jul. 5, 2018.
PCT Search Report, dated Sep. 30, 2015.

* cited by examiner

SYSTEM AND METHOD FOR DEVELOPING INDIVIDUAL AND TEAM WASHROOM COMPLIANCE PRACTICES

FIELD OF THE INVENTION

The present invention relates generally to public or semi-private washrooms, such as public restrooms, wherein individuals are detected and identified upon entry into the washroom facility and credited for performance of washroom activities.

BACKGROUND

It has been fairly well documented that loss of work time due to sickness and illness of employees is a significant and costly problem for companies. Proper hygiene practices in the workplace washrooms are widely recognized as an important measure in preventing the spread of illness. Simply washing one's hands after use of the washroom facilities or after contact with an infectious person or environment is paramount in preventing the spread of disease or illness, particularly in the food and health service sectors. Although employees are generally educated in such practices, adherence to applicable washroom practices can always be improved upon. Negative reinforcement (e.g., disciplinary action) is not a prime motivator in this regard.

Washroom detection systems have been proposed wherein patrons are detected upon entry into a public or semi-private washroom facility, for example by various detection systems, including motion sensors, mechanical door sensors, infra-red sensors, and the like, and a message is automatically generated and provided to the patron. For example, U.S. Pat. No. 4,896,144 describes a warning system adapted to warn someone to wash their hands prior to leaving or entering a facility in which hand washing is important. The system includes a door activated mechanism that can be either visible or audible, and can include a door locking system and a remote signaling system. The warning system is armed when the door is opened to permit entry into the facility and is de-activated upon the actuation of hand-washing facilities.

U.S. Pub. No. US 2006/0067545 A1 describes a device to encourage hand washing compliance in a facility such as a washroom, the device including a housing configured for detachably mounting on a support surface. An ambient light sensor is disposed relative to the housing to detect ambient light within the room. An audio device within the housing contains at least one audible hand washing compliance message track that is played over a speaker within the housing. A controller is in operable communication with the ambient light sensor and the audio device, and activates the device upon determining whether a threshold amount of ambient light is present in the room.

The systems described above are impersonal in that they issue the same generic message to all patrons. Eventually, the messages become mundane to the users and loose effectiveness. Some may even consider the impersonal messages to be an annoyance, and may ignore the messages altogether.

With respect to typical workplace washroom facilities, such as those facilities in a manufacturing plant, health care facility, office building, and the like, users of such facilities are generally not accountable to any authority for their personal washroom practices and, thus, other creative motivational means would be beneficial in encouraging employees to adhere to proper washroom practices.

The present invention provides a system and methodology wherein individuals and teams are self-motivated to practice proper washroom procedures.

SUMMARY OF THE INVENTION

Objects and advantages of the invention will be set forth in part in the following description, or may be obvious from the description, or may be learned through practice of the invention.

A method and associated washroom system are presented incorporating aspects of the invention. The term "washroom" is used generically herein to encompass any manner of public, semi-public, or private facility visited by patrons to use sink or toilet facilities, bathing facilities, changing facilities, and so forth. Such facilities are also known as restrooms, toilet closets, public bathrooms, men's room, ladies' room, and the like. A typical public or semi-private washroom has a number of toilet facilities or urinals and sinks.

Although the present method and washroom system are particularly useful in an "away-from-home" public or semi-private environment, the system is not limited by scope of use. As used herein, the term "away-from-home" means a place or location where people congregate for various reasons or purposes that are outside the typical home. Examples of away-from-home locations include places of business, such as office buildings, office suites, retail stores, and warehouses, manufacturing facilities; schools; hospitals and other types of medical facilities; places of worship; hotels and motels; conference centers; and the like. The method and system are particularly well-suited for structures wherein multiple washroom facilities are provided for use of the building tenants or an industrial or manufacturing site wherein multiple site facilities are provided for a controlled populace. It should be appreciated though that the present washroom system and method may prove useful in a residential or private environment, and such uses are within the scope and spirit of the invention.

In accordance with aspects of the invention, a system and related method are provided for encouraging individual employees of a business entity to practice proper washroom activities. It should be appreciated the type and nature of the business entity is not a limiting factor. The business entity may be, for example, a healthcare facility, academic institution, manufacturing plant, food service business, and so forth. The individual employees of the business entity are enrolled into a washroom rewards program, and at least certain of the washroom facilities available to the enrolled employees are designated for use in the rewards program. The designated washroom facilities are with an identification (ID) system that automatically identifies the enrolled employees within the washroom facility. Point values are assigned in the rewards program for defined washroom activities performed by the employees in the designated washroom facilities. Upon the employees performing one of the defined washroom activities in one of the designated washroom facilities, the employee is identified via the ID system. A server system is integrated with the ID system and automatically credits the point value assigned to the washroom activity to an individual employee account maintained by the server system. Provisions are made for the employees to redeem accumulated points in their individual employee account for an award value at predefined times in the program. The particular award value may vary, and can be any award that motivates the employees to accumulate points in the program. For example, the award may be additional vacation time, a monetary award, gift certificates, and so forth.

In a certain embodiment, the server system may generate a personalized message that is delivered to the employee in the washroom facility, wherein the personalized message names the employee by name and gives the point value earned by the employee for the performed washroom activity.

In one embodiment, the system and method are integrated with a personal health tracker device worn by the employee, and the personalized message may include health information obtained from the health tracker device.

The types of activities for which points are awarded may vary, but are generally those activities that enhance personal hygiene and cleanliness, or encourage proper and non-wasteful use of products in the washroom facility. In a particular embodiment, one of the defined washroom activities for which a minimum point value is assigned is simply entering the washroom facility without additional activity. One of the defined washroom activities may be a measure of the amount of a product dispensed from a dispenser in the washroom facility during performance of a defined washroom activity. Another defined washroom activity may be the amount of time the employee spends washing their hands. For this embodiment, a timer display may be provided in the washroom facility that indicates actual hand washing time to the employee.

The enrolled employees may be in competition with each other, wherein a winning outcome of the competition is based on the accumulated points of the competing employees. With this embodiment, a personalized message may be generated by the server system and delivered to the employee in the washroom facility that includes a current status of the employee in the competition.

The ID system may be variously configured to carry out its intended function. For example, the ID system may include an ID signal transmitter carried by each of the enrolled employees that generates an ID signal that is unique to the employee, and the designated washroom facilities may be configured with a receiver that receives the ID signals from the ID signal transmitters and transmits the ID signals to a controller that is in communication with the server system.

Other aspects of the invention include a washroom system and related method wherein patrons of designated washroom facilities are members of defined teams in a washroom use competition, wherein the teams receive points for team members performing certain washroom activities in designated washroom facilities. The competition may have a defined end date or event, and entitle the winning team to any manner of award, prize, or recognition. In certain embodiments, an ID signal transmitter is carried by the members of each defined team, wherein each of the ID signal transmitters generates an ID signal that is assigned to the member's respective team. The system includes one or more washroom facilities configured with a receiver that receives the ID signals from the ID signal transmitters upon the team members entering the facility and performing one or more of the designated washroom activities. A server system is in communication with the receivers, either directly or via a controller that receives the ID signals from the receivers in the washroom facility. The server system includes a memory with a team file for each team that contains the ID signals assigned to the team. The team file is accessed by the system to generate and transmit a personalized team message to a broadcast device in the washroom facility, the message containing the members team name and providing the point value awarded to the team for the washroom activity performed by the member. The message may contain any desired additional information, such as the current ranking or status of the member's team in the competition.

The server system is further configured to maintain individual team accounts and assign predefined point values to the member's team account for activities performed by the team member in the washroom facility.

In a particular embodiment, all of the ID signal transmitters assigned to a respective team generate the same ID signal such that individual members of the team cannot be differentiated by the ID signals.

In an alternate embodiment, each of the ID signal transmitters generates a unique ID signal that is associated by the server system with a particular individual member such that individual members on the team are identifiable from the unique ID signals. This embodiment allows for more personalized treatment of the team members. For example, the team files may also contain an individual file on each team member that contains information about the member (an authorized by the member), such as name, hobbies, favorite sport teams, and so forth. With the unique ID signal, the members file can be accessed by the server system and the information used to further personalize the message provided to the member in the washroom facility. For example, the message may also identify the member by name, or provide the members ongoing tally to the team's total accumulated points, and so forth.

In one embodiment, the system and method include a plurality of the washroom facilities within a building structure, such as the facilities within a multi-floor office building, that are available for use by the team members. The server system may be common to the plurality of washroom facilities and in communication with the various receivers via a wired or wireless communications network that may include a controller associate with each washroom facility. With this configuration, the teams may be formed between employees of a single business entity in the building structure. For example, each department within a business may form a team. In an alternate embodiment, the teams are formed by employees of different business entities in the building structure. For example, an accounting firm on one floor may form a team that competes with a marketing firm on a different floor in the building structure.

In a particular embodiment of the system and method for individuals or teams, the ID single transmitters are Bluetooth Low Energy (BTLE) beacons that emit a unique BTLE ID signal and the processor system maintains a library of the unique BTLE signals assigned to each respective team. The receivers are strategically located in the washroom facilities and are BTLE-enabled receivers that receive and transmit all or a portion of the unique BTLE ID signals to the processor system to enable retrieval of the team file related to the unique BTLE ID signal by the processor system. The BTLE beacons are relatively small and may be incorporated with any type of device provided to the team members, such as a badge, key chain or other trinket, and so forth. In one embodiment the BTLE beacon is enabled by a mobile smart device carried by the patron, such as a smart phone, that runs a background application that causes the mobile smart device to transmit the unique BTLE ID signal. The application may be programmed to only transmit the signal during specified times, such as normal working hours.

Each of the washroom facilities may include a plurality of individual functional locations, such as multiple stalls or sinks, wherein the designated washroom activities can be performed. Each of the functional locations may have one of the receivers associated therewith such that multiple team members or individual at the various functional locations are simultaneously awarded points for activities performed at the various functional locations.

The broadcast device within the washroom facility may be any one or combination of an audio device, video device, or audio-video device. For example, the broadcast device may be an audio-video screen that displays the personalized message in audio and visual format. In one embodiment, multiple such devices are located throughout the washroom facility and are operatively linked to a common receiver such that the multiple devices display generally the same message. In an alternate embodiment, the washroom facility comprises a plurality of individual functional locations, such as a plurality of toilet stalls or multiple sinks, with each of the functional locations having a respective receiver and associated broadcast device. With this configuration, multiple team members at the various functional locations may be simultaneously provided with their own personalized message.

DETAILED DESCRIPTION OF THE INVENTION

Figure 1:
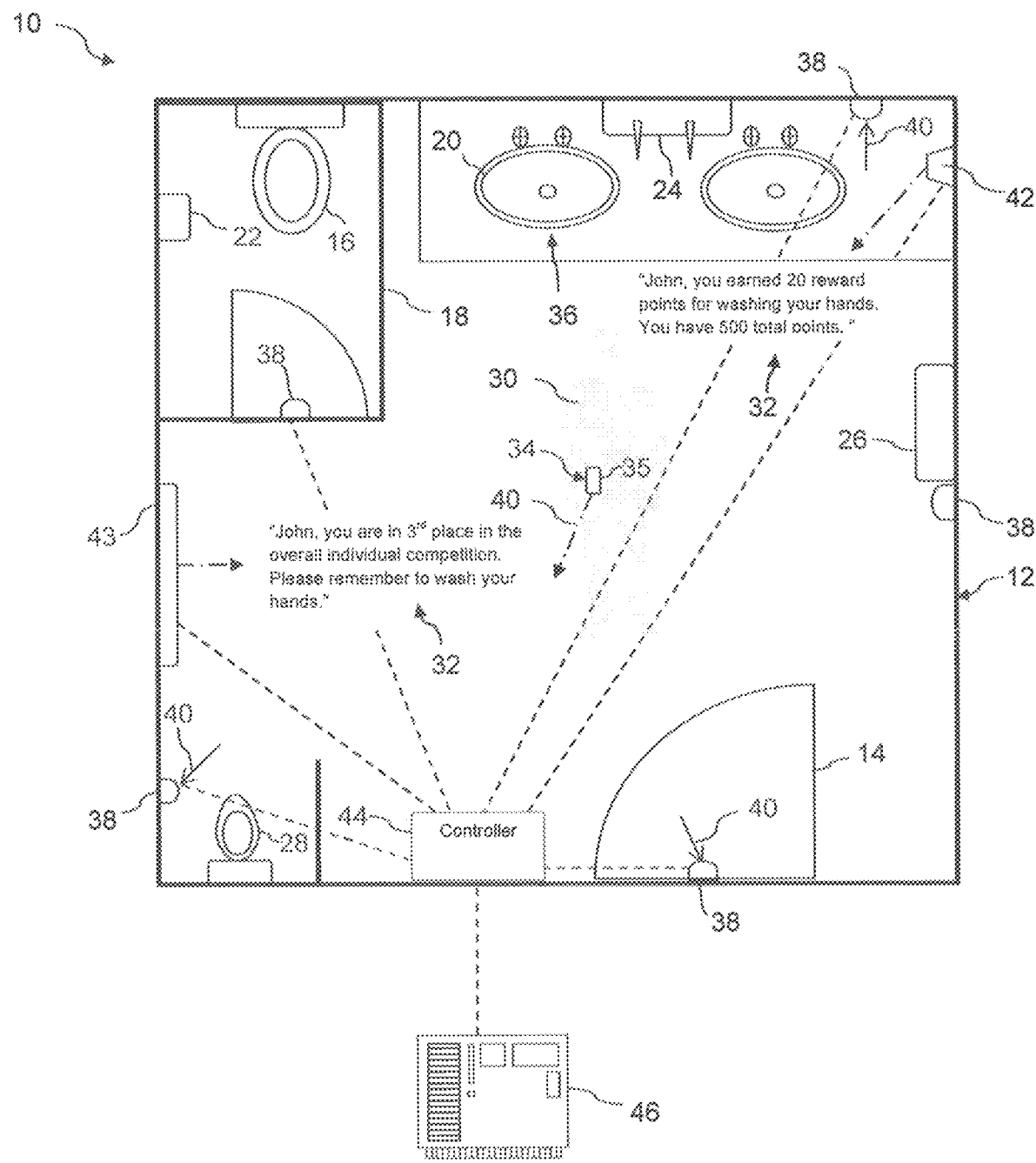
FIG. 1 is a diagram view of a washroom facility incorporating a system and method in accordance with aspects of the present invention.

Reference will now be made in detail to one or more embodiments of the invention, examples of the invention, examples of which are illustrated in the drawings. Each example and embodiment is provided by way of explanation of the invention, and is not meant as a limitation of the invention. For example, features illustrated or described as part of one embodiment may be used with another embodiment to yield still a further embodiment. It is intended that the invention include these and other modifications and variations as coming within the scope and spirit of the invention.

As mentioned, in one aspect, the present invention relates to a method and system wherein individual employees of a business entity are encouraged to perform proper washroom practices through participation in a washroom rewards program, wherein the washroom facilities available to the enrolled employees are specifically configured for use in the rewards program. The particular type of business entity is not a limiting factor. Referring to FIG. 1, an embodiment of a system and related method 10 are illustrated with respect to a public or semi-private washroom facility 12 within a participating business entity. The business entity 12 may have a plurality of these washroom facilities at various locations within a building or business site location.

The design and features of the washroom facility 12 depicted in FIG. 1 are for illustrative purposes only. The washroom facility 12 is depicted as a men's restroom facility having one or more individual stalls 18 (with individual toilets 16) and one or more urinals 28. A number of sinks 20 are also provided. Any combination of other conventional washroom components may also be provided in the washroom facility 14, such as toilet tissue dispensers 22, soap dispenser 24, towel dispenser 26, and so forth. The individual stalls 18, urinals 28, and sinks 20, may be considered as "functional locations" 36 wherein an individual employee 30 may perform a desired washroom function within the facility 12. It should be appreciated that any manner of additional functional locations 36 may also be included in the washroom facility 12, such as shower stalls, dressing rooms, infant changing stations, and so forth.

The employees 30 are enrolled in the washroom rewards program, which may be sponsored and administered by the employer. An efficient enrollment process may be conducted via a website maintained by the rewards program administrator (which may be separate from the employer), wherein the employees 30 may also establish their own unique employee account wherein earned points in the program are credited to the employee and tracked.

The washroom rewards program assigns respective point values to defined activities that are performed by the employees 30 patrons in the designated washroom facilities 12. Such activities may include, for example, simply visiting the washroom facility 12, washing one's hands in the washroom, dispensing of a paper product in the washroom, and so forth. The point values for such activities may be the same between different washroom facilities 12, or may vary from one facility 12 to another.

The point values assigned to the different washroom activities are published to the employees 30 by any convenient means, for example via the website where the employees 30 can track the status of their personal account, via an application downloaded to the employee's mobile smart phone, via print material at the workplace, and so forth.

At some time or event established by the rewards program, the employees 30 may redeem their accumulated points for items, service, or other "value." The employer or program administrator will preferably choose rewards that motivate the employees to participate and excel in the program, thereby enhancing personal hygiene and cleanliness in the workplace and minimizing waste of washroom facility products. As mentioned, an aspect of the awards program may place the enrolled employees 30 in competition with each other, wherein a winning outcome in the competition is a function of points earned in the program.

Upon an employee 30 performing one of the defined washroom activities in one of the designated washroom facilities 12, the employee 30 is identified and their personal account is automatically credited with the point value assigned to the defined activity by a central server system 46 that is in communication with a controller 44 assigned to each washroom facility 12, as explained in greater detail below.

Figure 2:
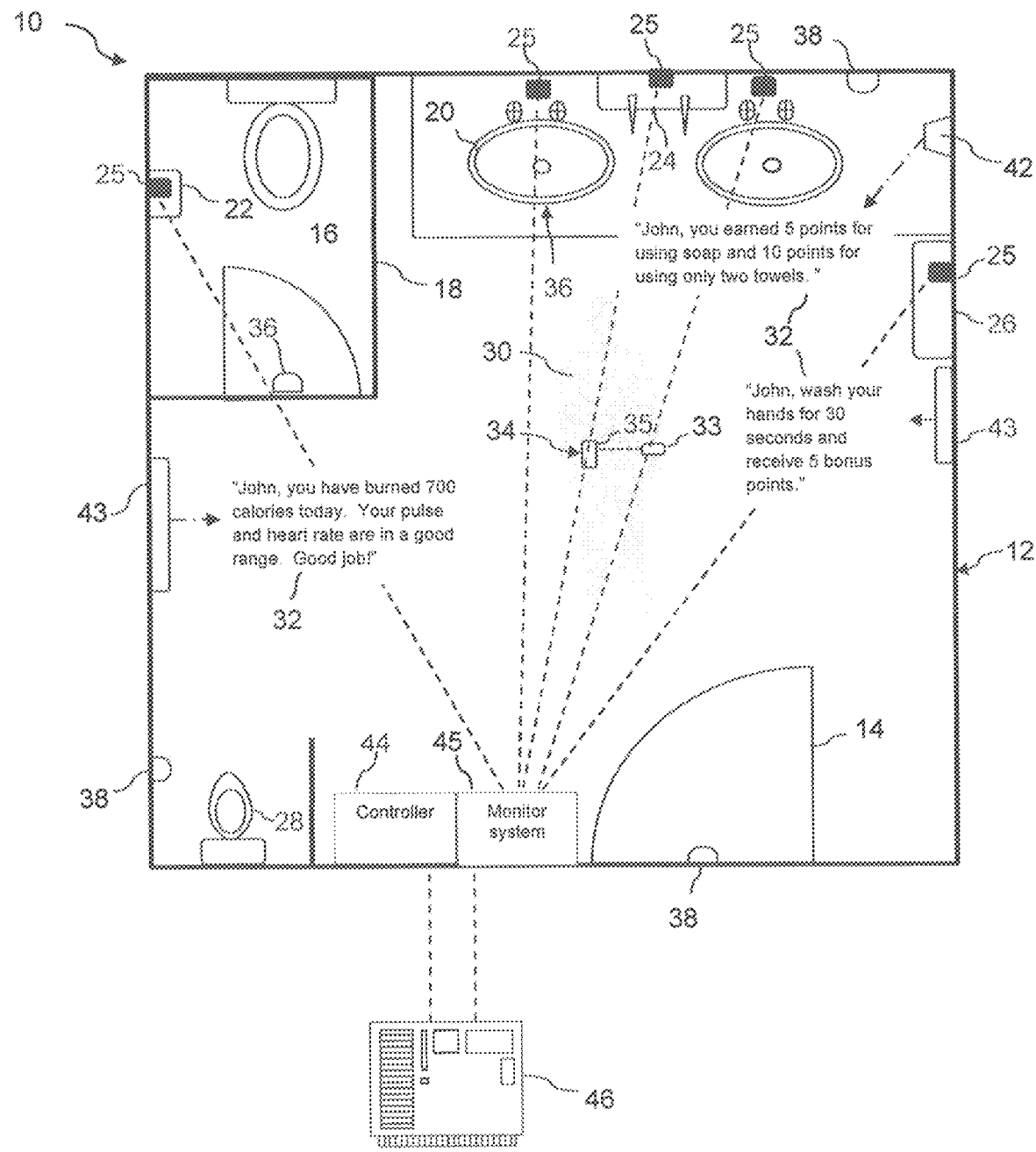
FIG. 2 is a diagram view of a washroom facility incorporating an alternate embodiment of a system and method of the present invention.

Referring to FIGS. 1 and 2, to carry out the steps discussed above, the washroom facility 12 is configured with one or more receivers 38 strategically located throughout the facility. Each employee is provided with an ID signal transmitter 34 that transmits an ID signal 40 that is unique to the particular employee 30 and is received by one or more of the receivers 38 depending on the employee's location within the facility 12. In this manner, as explained in greater detail below, the system 10 is able to differentiate between employees 30 that enter the facility 12.

In the embodiment illustrated in FIG. 1, the washroom facility 14 includes a receiver 38 positioned above or near the entrance or door 14 to the facility 12. At this location, the receiver 38 is used to detect the individual employee 30 as they enter the facility 12. Respective receivers 38 are also located at the various functional locations 36 within the washroom facility 12, wherein use of such locations 36 is inferred by detection of the employee 30 at the location. For example, if the receiver 38 located near the sinks 20 detects an employee 30 for a defined period of time, it can be inferred that the employee has washed their hands. Detection of the employee 30 by the receiver 38 adjacent to the paper towel dispenser 26 for a defined period of time infers that the employee has used towels from the dispenser 26.

The ID signal transmitters 34 carried by the employees 30 may be small, portable devices that are provided to the employees 30 by the program administrator, for example in the form of an attachment to a work badge, bracelet, token, key chain, and so forth. In certain embodiments, the transmitter 34 may be incorporated with a patron's mobile smart device 35, such as a smart phone, tablet, PDA, or other network-enabled device (all referred to herein generically as a "mobile smart device"). The mobile smart device 35 runs a low-power background application previously downloaded by the employee 30 from a source (e.g. a website) that allows the mobile smart device to function as a transmitter at times programmed by the user, for example during normal working hours.

Referring to FIG. 1, the system 10 includes a controller 44 that is in wired or wireless communication with the receivers 38 located within the washroom facility 12. The controller 44 may be located within the facility 12, for example within a cabinet or other location, or remote from the facility 12. The controller 44 is in communication with the program administrators central server system 46 via any suitable communications network and includes any manner of hardware and software configuration to carry out the functions described herein, such as setting/controlling the various functions of the receivers 38, as well as well as various broadcast devices 42, 43, as described in greater detail below.

As mentioned, the employee's transmitter 34 (which may be a mobile smart device 35) will generate and transmit a unique signal 40 received by one of the receivers 38 that will identify the particular employee 30 to the server system 46. The receiver 38 transmits all or a portion of the received ID signal to the controller 44, which may tag the signal with the identity and location of the particular washroom facility 12 and receiver 38 before transmitting the signal 40 (which includes a signal generated from the signal 40) to the central server system 46.

The central server system 46 is in communication with the all of the various controllers 44 and includes a memory with a respective file associated with each of the unique ID signals 40, wherein the system 46 retrieves or opens the stored file associated with the unique ID signal 40 to credit the employee's personal account with the points earned for the particular washroom activity performed by the employee 30. The server system 46 includes a file with the point values assigned to each of the receivers 38 for this purpose. The employee's file may also include personal information, such as the employee's job or position within the company, medical conditions or medications, personal preferences, such as favorite sports teams, favorite music, hobbies, and the like. This information may be authorized by the employee via a personal profile questionnaire or other type of submission to the program administrator, and may be retrieved by the server system 46 and is used to generate and transmit a personalized message 32 for the employee 30 via a broadcast device 42, 43 within the facility 12.

In the particular embodiment illustrated in FIG. 1, the messages 32 broadcast to the employee have been personalized with the employee's name. At least one of the messages 32 states the points earned by the employee for the particular activity performed by the employee 30 and credited to their account. One of the messages 32 may inform the employee 30 of their total point value in the program, as depicted in FIG. 1. If the employees 30 are in competition, one of the messages 32 may inform the employee of their current status or ranking in the competition. The messages are transmitted via the controller 44 and a broadcast device 42, 43 within the washroom facility 12. For example, as depicted in FIG. 1, a broadcast device 42 in the form of a speaker is provided near the sinks 20 and transmits a personalized message 32 informing the patron 30 that he earned 20 points for washing his hands. Another broadcast device 43 is provided on a wall of the facility and is an audio/video (A/V) device that informs the employee of their position in the competition. This A/V 43 device may be used to display any other type of information to the employee desired by the program administrator. All of these devices 42, 43 are in communication with the controller 44 via a wireless communications network, as depicted by dashed lines in FIG. 1.

Still referring to FIG. 1, the transmitter devices 34 carried by the employees 30 may be low-power devices having a defined limited transmit range such that the employee 30 must be relatively close to a receiver 38 to be detected. For example, as the employee 30 enters the facility 12, the receiver 38 above the door 14 will detect the employee's transmitter device 34, and the employee may be automatically credited with points simply for entering the facility 12. However, once the employee 30 moves further into the facility 12, he will be beyond the range of door receiver 38. Thus, the other receivers are strategically located relative to a functional location 36 so as only to detect an employee 30 at a distance/location that reasonably assures that the employee is using the location 36. Thus, with this configuration, a number of different employees 30 may be within the washroom facility 12 using different ones of the functional locations 36 and are individually detected by system. In addition, each of the functional locations may be configured with a respective broadcast device 42, 43 so that the respective employee 30 utilizing the individual functional location 36 can receive a personalized message 32 via the broadcast device associated with their functional location. For example, an employee 30 at one of the sink locations 20 may be detected, while a different employee in the stall 18 will be separately detected. The server system 46 may generate and transmit a separate personalized message 32 to each of these employees that are broadcast over different devices 42, 43. Thus, the system 10 can simultaneously differentiate between different employees and different washroom activities.

As discussed with respect to FIG. 1, each of the washroom facilities 12 is equipped with wireless communication capability between the receivers 38 and the transmitters 34 carried by the respective employees 30, wherein an intermittently transmitted data packet (i.e., unique ID signal 40) is transmitted and received within a limited range. In this regard, the washroom facilities 12 are considered to be "communication-enabled" facilities. It has been found that Bluetooth Low Energy (BTLE) technology is particularly well-suited for purposes of systems 10 in accordance with the present subject matter. For example, the transmitter devices 34 carried by the employees 30 may be BTLE beacons that transmit the unique ID signal 40 as a BTE formatted signal, and the receivers 38 are BTLE scanners configured to receive and recognize the BTLE formatted signal 40.

BTLE beacons are commercially available and are relatively small devices that can be disguised as a "trinket" that is worn or carried by the employees 30. For example, the BTLE beacon may be a bracelet (e.g., similar to a medical alert bracelet), a component of an identification badge worn by company employees, a decorative or functional item attached to a person's belt or clothes, and so forth.

BTLE devices are well-known to those skilled in the art, and a detailed explanation of their function and operation is not necessary for an understanding and appreciation of the present invention. Briefly, BTLE beacons are a class of low-energy, low-cost radio transmitters that can a receiver running BTLE applications of their presence, which in turn enables the receiver to perform certain actions when in close proximity to the beacon. These devices are often referred to as "iBeacons", which is the name Apple chose for its implementation of the BTLE technology. Each BTLE beacon broadcasts a unique identification signal using the BTLE standard format. These unique signals are also known as iBeacon "advertisements." The BTLE receiver runs an application that enables the device to scan for and receive the signals within transmitting range of the BTLE beacons. The receiver will automatically "react" to the received signal and may start other BTLE-enabled applications for various purposes, including communication with a central server, which in this case is the processor system 46.

A typical use of BTLE technology is relatively precise indoor geo-location ("micro-location"). A BTLE-enabled application on the receiver is notified when the BTLE beacon (transmitter 34) moves out of range of the receiver, and thus is able to determine distance of the transmitter 34 (and employee 30) are from the receiver 38. The exact geo-location of the receiver 38 is known, and thus the exact location of the transmitter 34 (and employee) is calculated based on relative distance from the receiver 38 as a function of signal strength. With this location information, the server system 46 in communication with the receivers 38 via the controller 44 can generate a personalized message 32 telling the employee 30, for example, that a nearby functional location 36 in the facility 12 is out-of-order or occupied, and so forth.

In certain embodiments, the BTLE beacon function may be incorporated with the employee's mobile smart device 35, which runs a low-power background application previously downloaded by the employee 30 from a source (e.g. a website) that allows the mobile smart device 35 to function as a BTLE beacon that intermittently transmits the unique BTLE signal during certain times of the day, for example during normal working hours, or other times programmed by the patron 44b.

It should be appreciated that the present systems and methods are not limited to BTLE technology. Other transmitter/receiver technologies may also be utilized for practice of the invention. For example, Near Field Communication (NFC) implementations may be utilized. In another embodiment, Radio Frequency Identification (RFID) technology may be used. Other communication technologies are also within the scope and spirit of the invention.

FIG. 2 depicts an embodiment of the method and system 10 incorporated with a "smart" washroom facility 12. With this type of facility, the consumable product dispensers, such as the paper towel dispenser 26, toilet tissue dispensers 22, and soap dispenser 24, are equipped with respective sensors 25 that detect the amount of product usage based on any number of operational principles, such as run time of the dispenser or direct measurement of the amount of product dispensed. Numerous types of these product dispensers are well known in the industry and a detailed explanation thereof is not necessary for purposes of the present disclosure. The product dispensers 22, 24, 26 are in communication with a monitoring system 45 via any manner of suitable wireless communication system (as indicated by the dashed lines in FIG. 2). Typically, the monitoring system 45 is a computer-implemented system that may be remotely located from the washroom facility 12. The monitoring system 45 may monitor a number of similarly-configured washroom facilities 12 within a building or business site location. With this particular system 10, the controller 44 is also in communication with the monitoring system 45 and, thus, can receive information regarding product usage in any one of the dispensers 22, 24, 26 located in the washroom facility 12. The monitoring system 45 may also be in direct communication with the system server 26. Information from the monitor system 45 may be used as a basis for reward points and reflected in one or more of the personalized messages 32 generated and displayed or transmitted to the employee 30.

For example, referring to FIG. 2, the sensor 25 associated with the paper towel dispenser 26 detected that the employee 30 only used two towels (as opposed to a wasteful number of towels). This information is conveyed by the monitor system 45 to the controller 44 or directly to the server system 46, wherein reward points are assigned based on proper towel usage, and the personalized message 32 informs the employee that he earned ten points of using a proper number of paper towels. Although not reflected in FIG. 2, it is also within the scope of the present method and system 10 to deduct points from the employee's account for wastage or improper use of one of the dispensers 22, 24, 26. For example, if the employee 30 had used five paper towels, the personalized message may have informed him that five reward points were deducted from his account.

FIG. 2 also reflects that the sensor 25 associated with the soap dispenser 24 confirmed to the monitor system 45 that the patron 30 actually dispensed soap for his hand-washing activity. This action may qualify for reward points, as indicated by the personalized message 32 informing the employee 30 that five reward points were credited for using soap.

Still referring to FIG. 2, a sensor 25 is associated with each of the sinks 18 and detects the actual run time of the faucet wherein water is dispensed, e.g., for a hand-washing activity. Points may be awarded for a minimum amount of time the employee 30 spends washing their hands, as determined by the sink sensor 25. This information may be conveyed to the employee 30, for example via the A/V display 43 located adjacent to the towel dispenser 26 that informs the employee that five bonus points will be credited to his account for spending at least thirty seconds washing his hands. Any one of the display devices 43 may initiate a timer that is visible to the employee and actually tracks the run time of the faucet (and thus the hand-washing time).

The present method and system 10 also encompass incorporating information from a personal health monitoring device 33 (FIG. 2) into the personalized messages 32 displayed or transmitted to the employee 30. For example, FIG. 2 depicts a personal health monitoring device 33 worn by the employee 30. This device 33 may be any one of a number of commercially available devices, such as a "UP3 Fitness Tracker" from Jawbone having a principal place of business in San Francisco, Calif., or one of fitness trackers available from FITBIT, Inc., having a principal place of business in San Francisco, Calif. These devices are compatible with most mobile smart device operating systems (such as the employee's smart phone 35) such that the health tracking data is uploaded and displayed to the user via their smart phone. As discussed above, in the embodiment wherein the employee's mobile smart device 35 is configured to function as the BTLE scanner via an application downloaded to the device 35, such application may also transmit the health tracking information from the device 33 with the signal 40 to the central server system 46. The server system 46 may use such information to generate a personalized message 32 provided to the employee 30 in the washroom facility 12. For example, FIG. 2 depicts a message 32 displayed on the A/V device 43 informing the employee by name of his calorie burn count for the day and the status of his heart rate and pulse.

As discussed above, another aspect of the invention relates to a system and related method wherein patrons of the designated washroom facilities are members of defined teams in a washroom use competition, wherein the teams receive points for team members performing certain washroom activities in designated washroom facilities. The competition may have a defined end date or event, and entitle the winning team to any manner of award, prize, or recognition. With this method, the teams may be formed between employees of a single business entity in the building structure. For example, each department within a business may form a team. In an alternate embodiment, the teams are formed by employees of different business entities in the building structure. For example, an accounting firm on one floor may form a team that competes with a marketing firm on a different floor in the building structure.

Figure 3:
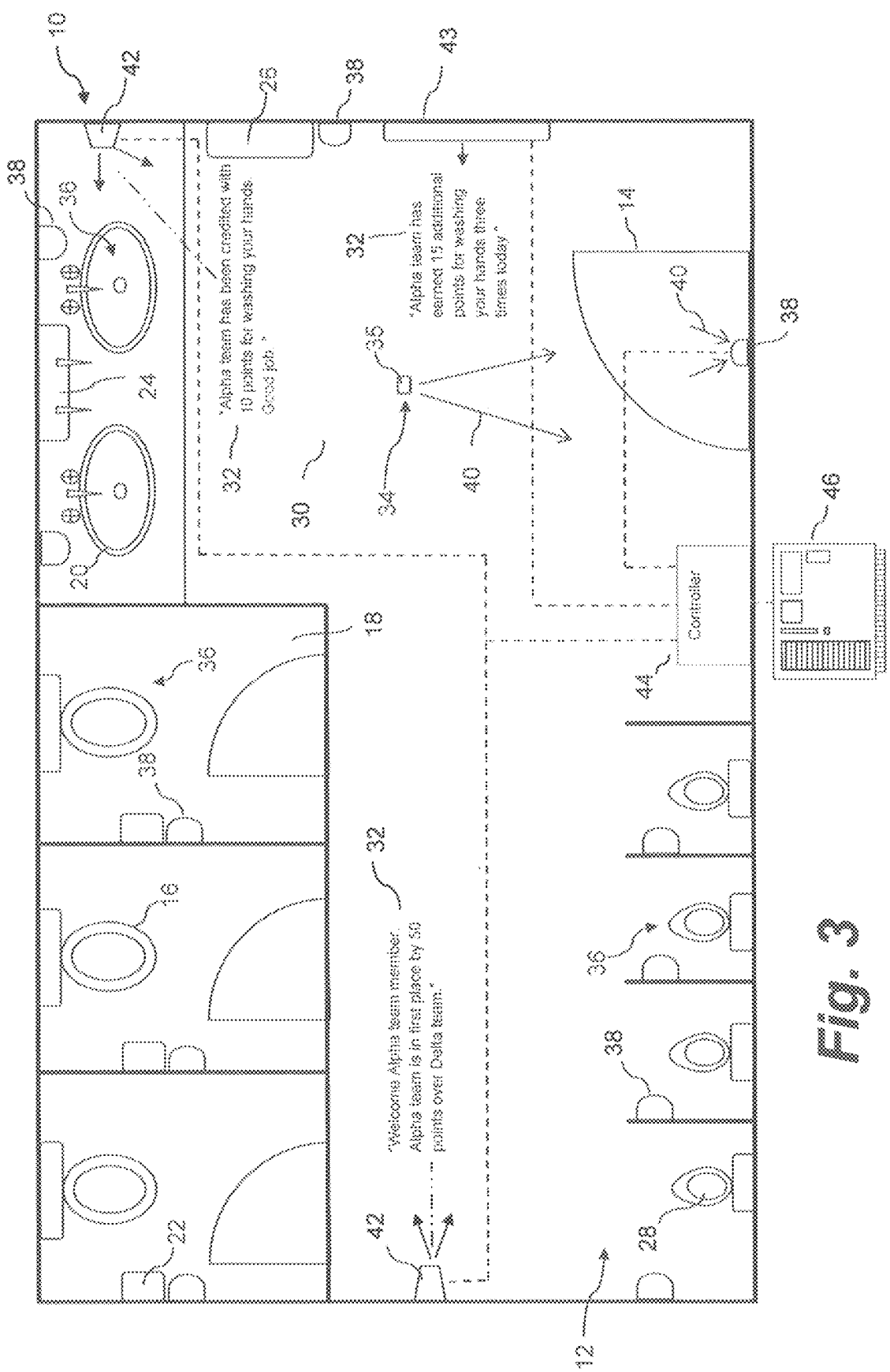
FIG. 3 is a diagram view of a washroom facility incorporating yet another embodiment of a system and method of the invention.
Figure 4:
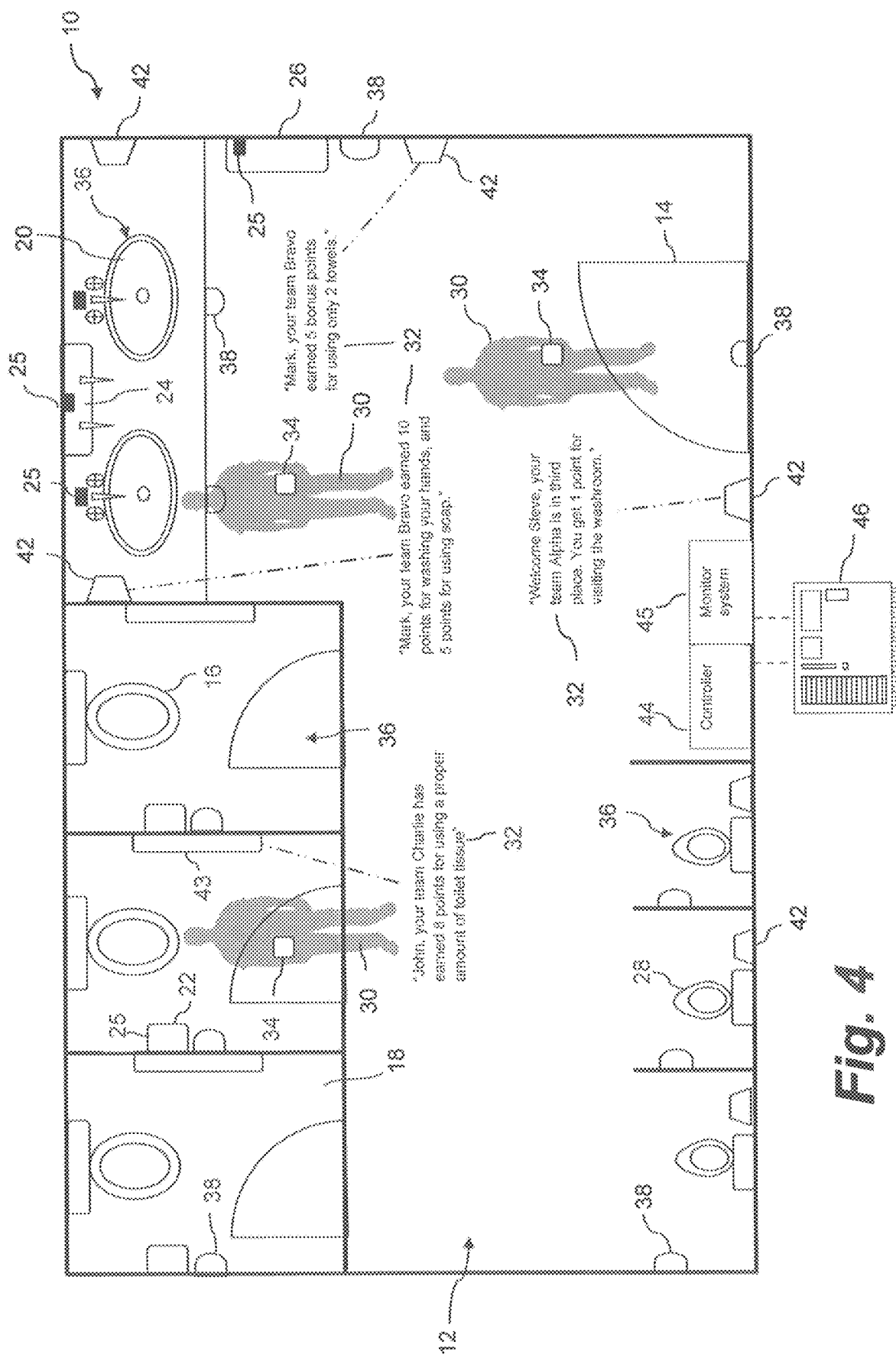
FIG. 4 is a is a diagram view of a washroom facility incorporating still another embodiment of a system and method of the invention.

Aspects of the "team" concept are depicted in the washroom facilities 12 of FIGS. 3 and 4. The washroom facilities 12 are essentially as described above with respect to FIGS. 1 and 2, and such common aspects need not be described again.

Referring to FIGS. 3 and 4, an ID signal transmitter 34 is carried by the members of each defined team, wherein each of the ID signal transmitters 34 generates an ID signal that is assigned to the member's respective team. The designated washroom facilities 12 available for use by the teams are configured with one or more receivers 38 that receives the ID signals 40 from the ID signal transmitters 34 upon the team members 30 entering the facility and performing one or more of the designated washroom activities. The server system 46 is in communication with the receivers 38, either directly or via the controller 44 that receives the ID signals 40 from the receivers 38 in the washroom facility 12. The server system 44 includes a memory with a team file for each team that contains the ID signals 40 assigned to the team. The team file is accessed by the system 46 to generate and transmit the personalized team messages 32 to one of the broadcast devices 42, 43 in the washroom facility 12. At least one of the messages 32 contains the members team name and provides the point value awarded to the team for the washroom activity performed by the member 30. The message 32 may contain any desired additional information, such as the current ranking or status of the members team in the competition.

FIG. 4 is similar to FIG. 2 above in that the various product dispensers 22, 24, 26 are associated with a respective sensor 25, with the sensors in communication with the monitoring station 45, as discussed above with respect to FIG. 2. With this configuration, information from the monitor system 45 may be used as a basis for reward points and reflected in one or more of the personalized messages 32 generated and displayed or transmitted to the various team members 30.

FIG. 4 also depicts multiple team members 30 engaging with the system simultaneously in a single washroom facility 12, which includes a plurality of individual functional locations 36, such as a plurality of toilet stalls 18 or multiple sinks 20, with each of the functional locations 36 having a respective receiver 38 and associated broadcast device 42, 43. With this configuration, multiple team members 30 at the various functional locations 36 may be simultaneously provided with their own personalized message 32.

Certain embodiments will have multiple washroom facilities 12 within a single building or multiple buildings linked to one or more central server system 46 and one or more monitoring systems 45, with each product dispenser and receiver 38 within the multiple of washroom facilities 12 in communication with the systems 45, 46. In this regard, a communications network is configured for these functions, wherein the individual dispensers are considered as network-enabled devices that may be directly connected to the network through a plurality of direct network links, thereby eliminating the need for the bus, router, or other networking equipment. It should also be appreciated that each of the network enabled devices (or a group of such devices) in this configuration may represent a node that, in turn, may be directly connected and/or multiplexed to the network via the direct network links. Further, the direct network links may represent secure communications channels physically hardened against tampering and/or the communications may be encrypted to prevent unauthorized access to information transmitted thereon.

The central server system 46 (which may be integrated with a monitoring system 45) may include a host computer, which may be an integrated server, or include any manner of periphery server or other hardware structure. The central processor system 46 may be a single networked computer, or a series of interconnected computers having access to the network via a gateway or other known networking system. Generally, the central server system 46 may include a central controller configured to manage, execute and control the individual terminal dispenser units, and to interface with the network enabled broadcast devices for retrieval/generation and play of the personalized messages described herein. The central server may include a memory for storing reward program procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 10.

The central server system may be directly or indirectly connected through the I/O bus to any manner of peripheral devices such as storage devices, wireless adaptors, printers, and the like. In addition, a database (DB) may be communicatively connected to the central server and provide a data repository for the storage and correlation of information gathered from the individual dispenser units, receivers, display devices, or nodes of such devices.

It should be appreciated that the network-enabled devices (e.g., the individual dispenser units and/or display devices)

may include similar features or may be configured with functionality to allow for an exchange of information required to function as described herein. The network-enabled devices may include a number of internal components, such as a controller having a program memory, a microcontroller or microprocessor (MP), a random access memory (RAM), and an input/output (I/O) bus, all of which may be interconnected via an address or data bus. The server system may include multiple, and even redundant, program memories and random access memories to increase expandability, capacity and/or processing speed.

The program memory and random access memory may be implemented as a solid-state memory, an integrated circuit, a magnetically readable memory, and/or optically readable memories. Further, the program memory may be read only memory (ROM) or may be read/write memory such as a hard disk. In the event that a hard disk is used as the program memory, the data bus may comprise multiple address/data buses, which may be of differing types, and there may be a separate I/O circuit between the data buses.

Network-enabled devices may be distributed throughout a single business establishment and connected with a LAN, or throughout multiple sites and connected with a WAN. Further, the LAN and/or WAN connecting each of the devices may include one or more separate and secure buses, routers, web servers, gateways and other networking equipment to provide continuous and/or redundant connectivity to the network.

Figure 5:
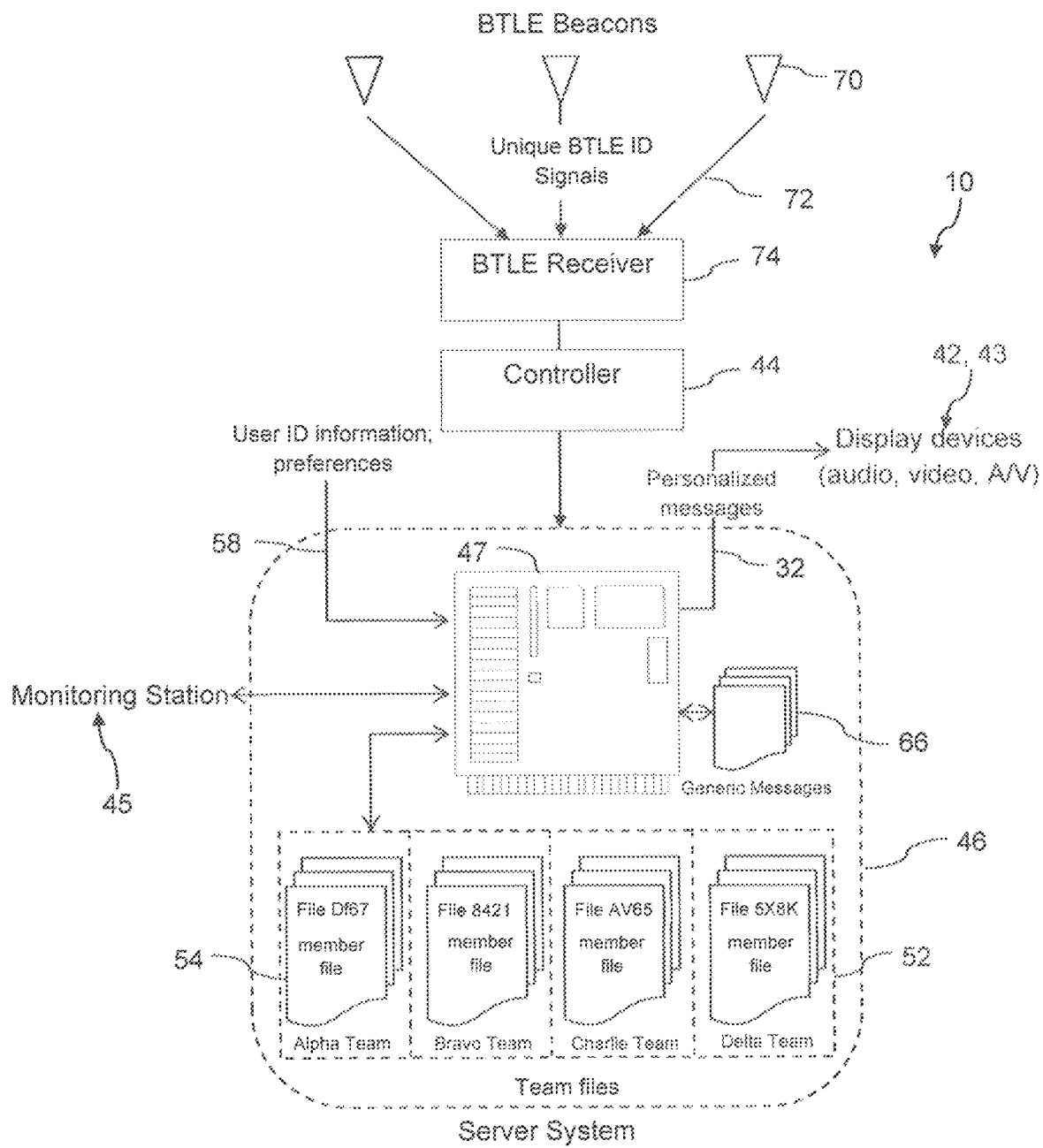
FIG. 5 is a component diagram view of certain control features of a system in accordance with the invention.

FIG. 5 is a schematic illustration of certain control aspects of a system 10 in accordance with the invention. In this particular system 10, the server system 46 includes any manner of computer-implemented server 47. The system 46 includes a library 52 in which the individual employee or team member files 54 are stored. Each file 54 is associated with a unique BTLE signal 72 generated by a BTLE beacon 70. As discussed above, the BTLE beacons 70 are an embodiment of a transmitter 34 carried by the individual employee or team member that visits a washroom facility 12 equipped with the system 10. The unique BTLE signals 72 are received by a BTLE enabled receiver 74 located within the washroom facility 12. As discussed above, a single receiver 74 may be associated with each washroom facility 12, or a plurality of different receivers 74 may be located throughout the facility 12, for example at each of the individual functional locations 36 within the facility 12.

Still referring to FIG. 5, the BTLE receiver 74 transmits all or a portion of the signals 72 (including a signal generated from the signal 72) the to the server system 46 (via a controller 44 in certain embodiments), which retrieves the related files, credits the employee or team member with the points earned for performance of the washroom activity, and generates the personalized messages 32.

FIG. 5 depicts a number of inputs to the server system 46 that enable different types of personalized messages 32 to be generated and broadcast to the patrons. For example, one of the inputs 58 labeled "user ID information, preferences" is the input that enables the individual employees or team members of the washroom facility 12 to enter their personal information and preferences.

FIG. 5 also depicts a library 66 of generic messages that are not yet personalized for an individual employee or team member. For example, such messages may simply be greetings, such as "Good afternoon _____" or "Have a nice day _____", or relate more specifically to the rewards program, such as "_____, you have earned 10 points for washing your hands." The system 46 may retrieve any one or combination of these generic messages 66 and then use personal information obtained from the files 54 to populate the generic messages 66, thereby transforming the generic messages 66 into personalized messages 32.

The library 66 of generic messages may convey general health or well-being information and suggestions to the employees or team members. For example, such message may encourage the person by name to exercise at least one-half hour that day, or inform the individual of exercise class schedules at an on-site facility.

While the present invention has been described in connection with certain preferred embodiments it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method for encouraging individual employees of a business to practice proper washroom activities through team competition, comprising:
   establishing a plurality of teams in a washroom rewards program competition, wherein each team has one or more team members;
   designating one or more washroom facilities for use by the team members in the rewards program competition, and configuring the designated washroom facilities with an identification (ID) system configured to identify team members within the designated washroom facility, wherein each of the washroom facilities includes a plurality of individual functional locations where one or more washroom activities can be performed, each of the functional locations associated with one or more functional location receivers;
   receiving, by a server, a first unique ID signal from the ID system that is associated with at least one team member upon the at least one team member entering the washroom facility;
   in response to receiving the first unique ID signal, accessing, by the server, a team file associated with the first unique ID signal;
   receiving, by the server, a second unique ID signal from one or more functional location receivers upon the at least one team member completing one or more washroom activities;
   in response to receiving the second unique ID signal, determining, by the server, reward points based on the one or more washroom activities completed by the at least one team member;
   crediting or deducting, by the server, the reward points to the team file of the at least one team member;
   generating, by the server, a personalized team message informing the at least one team member of the rewards points earned or deducted; and
   transmitting to one or more broadcast devices located in the washroom facility, by a controller in communication with the server, the personalized team message comprising the reward points earned or deducted and current rankings of the at least one team member's team relative to the plurality of teams.

2. The method as in claim 1, wherein the teams are formed between employees of a single business entity in the building structure or business site location.

3. The method as in claim 1, wherein the teams are formed by employees of different business entities in the building structure or business site location.

4. The method as in claim 1, wherein the ID system includes an ID signal transmitter carried by each team member that generates the first unique ID signal associated with the team member's team, the designated washroom facilities configured with a receiver that receives the ID signals from the ID signal transmitters and transmits the ID signals to a controller, the controller in communication with the server system.

5. The method as in claim 4, wherein all ID signal transmitters assigned to team members of a single team generate a same first unique ID signal such that individual members on the team are not differentiated by the first unique ID signals.

6. The method as in claim 4, wherein each of the ID signal transmitters generates a first unique ID signal that is associated by the server system with a particular individual member such that individual members on the team are identifiable from the first unique ID signals, the server system maintaining a file on each team member that contains personal information about the team member.

7. The method as in claim 6, wherein the personalized team-message also identifies the team member by name and contains additional personal information or instruction to the team member generated from information contained in the team member's file.

8. The method as in claim 4, wherein the ID single transmitters are Bluetooth Low Energy (BTLE) beacons that emit a unique BTLE ID signal, the server system maintaining a library of the unique BTLE signals assigned to each respective team, the receiver comprising a BTLE-enabled receiver that receives and transmits all or a portion of the unique BTLE ID signals to the controller to enable retrieval of the team file related to the unique BTLE ID signal by the server system.

9. The method as in claim 8, wherein the BTLE beacon is incorporated with a device provided to the team members.

10. The method as in claim 8, wherein the BTLE beacon is incorporated with a mobile smart device carried by the team members, the mobile smart device having an application that causes the mobile smart device to transmit the unique BTLE ID signal.

11. The method as in claim 1, wherein the one or more broadcast devices are a speaker.

12. The method as in claim 1, wherein the one or more broadcast devices are an audio/video device.

13. The method as in claim 12, wherein the audio/video device includes a timer visible to the team member for tracking an amount of time the team member spends relative to the functional location.

* * * * *